(12) United States Patent
Lefebure et al.

(10) Patent No.: US 10,703,021 B2
(45) Date of Patent: Jul. 7, 2020

(54) CAVITY MOLD ALIGNMENT SYSTEM FOR BLOW MOLD TOOLING

(71) Applicant: R&D Tool & Engineering Co., Lees Summit, MO (US)

(72) Inventors: Brian R. Lefebure, Lees Summit, MO (US); Jincheng Chen, Leawood, KS (US); Jeffry B. Hauptmann, Peculiar, MO (US)

(73) Assignee: R&D Tool & Engineering Co., Lee's Summit, MO (US)

( * ) Notice: Subject to any disclaimer, the term of this patent is extended or adjusted under 35 U.S.C. 154(b) by 189 days.

(21) Appl. No.: 15/615,474

(22) Filed: Jun. 6, 2017

(65) Prior Publication Data

US 2018/0345564 A1     Dec. 6, 2018

(51) Int. Cl.
| | | |
|---|---|---|
| *B29C 33/30* | (2006.01) | |
| *B29C 49/06* | (2006.01) | |
| *B29C 49/48* | (2006.01) | |
| *B29C 45/33* | (2006.01) | |
| *B29B 11/08* | (2006.01) | |
| *B29C 45/17* | (2006.01) | |
| *B29C 48/25* | (2019.01) | |

(52) U.S. Cl.
CPC ............. *B29C 33/30* (2013.01); *B29B 11/08* (2013.01); *B29C 33/303* (2013.01); *B29C 33/305* (2013.01); *B29C 33/308* (2013.01); *B29C 45/1742* (2013.01); *B29C 45/332* (2013.01); *B29C 48/2665* (2019.02); *B29C 49/06* (2013.01); *B29C 49/48* (2013.01); *B29C 2049/4864* (2013.01)

(58) Field of Classification Search
CPC ................... B29C 33/30–308; B29C 48/2665
See application file for complete search history.

(56) References Cited

U.S. PATENT DOCUMENTS

| | | | | |
|---|---|---|---|---|
| 5,332,384 | A | * | 7/1994 | Abramat ............... B29C 33/303 249/141 |
| 5,776,518 | A | * | 7/1998 | Wohlgemuth ........ B29C 33/303 249/158 |
| 8,523,556 | B2 | | 9/2013 | Fields et al. |
| 8,714,965 | B2 | | 5/2014 | Chen |
| 2002/0081348 | A1 | * | 6/2002 | Bouti ................... B29C 45/2806 425/549 |
| 2004/0101590 | A1 | * | 5/2004 | Petrou ................. B29C 33/0022 425/589 |

(Continued)

*Primary Examiner* — Alison L Hindenlang
*Assistant Examiner* — George W. Brady
(74) *Attorney, Agent, or Firm* — Hovey Williams LLP

(57) ABSTRACT

An injection station of an injection blow molding machine. The injection station comprises a lower die plate and an upper die plate, with lower and upper die plates being shiftable relative to one another between an open position and a closed position. The injection station additionally includes one or more lower mold halves rigidly secured to the lower die plate. The injection station additionally includes one or more upper mold halves floatingly secured to the upper die plate such that positions of the upper mold halves are configured to be adjusted with respect to the upper die plate. Each of the lower mold halves corresponds with an upper mold half to present one or more mold cavities when the lower and upper die plates are in the closed position.

16 Claims, 13 Drawing Sheets

(56) References Cited

U.S. PATENT DOCUMENTS

| | | | |
|---|---|---|---|
| 2008/0131547 A1* | 6/2008 | Mohammed | B29C 45/1781 |
| | | | 425/168 |
| 2009/0166924 A1* | 7/2009 | Kuttappa | A63B 37/0003 |
| | | | 264/277 |
| 2014/0042673 A1* | 2/2014 | Fields | B29C 49/061 |
| | | | 264/537 |

* cited by examiner

CAVITY MOLD ALIGNMENT SYSTEM FOR BLOW MOLD TOOLING

BACKGROUND OF THE INVENTION

1. Field of the Invention

Embodiments of the present invention broadly relate to cavity molds for blow mold tooling. In particular, embodiments of the present invention relate to an alignment system for cavity molds used for blow mold tooling.

2. Description of the Related Art

Injection blow molding is a technique used to create various articles, such as plastic bottles. The injection blow molding process is generally performed with an injection blow molding machine that first injects a hot-melt resin into a plurality of injection cavity molds to form one or more parisons of desired sizes and shapes. Thereafter, the parisons can be blown, under force of a pressurized fluid, into a plurality of blow cavity molds to form the final molded articles.

An injection station of the injection blow molding machine typically includes a split parison mold assembly comprising one or more upper mold halves and one or more lower mold halves. When closed together, the upper and lower mold halves define a plurality of cavities within which the parisons can be formed. Specifically, injection nozzles are configured to inject hot-melt resin into the cavities so as to form the parisons. To remove a set of newly formed parisons from the mold, the upper mold half is raised off the bottom mold half, and cores that carry the newly-formed parisons are lifted and rotated out from between the mold halves. A new set of cores can be placed in the cavities, and the process repeated to create additional parisons.

To ensure that the parisons are manufactured according to specifications, including according to specific sizes, shapes, surface textures, continuities, and the like, it is necessary for the upper and lower mold halves of the injection station to be precisely aligned when in the closed position so that the cavities can correspond to the parison specifications. However, such alignment can be difficult to maintain as the upper and lower mold halves are repeatedly opened and closed. Furthermore, variations in temperature throughout the injection station tooling are known to cause changes in the alignment of the mold halves. Thus, there is a need for an injection station of an injection blow molding machine that is capable of ensuring that the upper and lower mold halves are consistently in proper alignment when in a closed position.

SUMMARY OF THE INVENTION

Some embodiments of the invention disclose an injection station of an injection blow molding machine, with the injection station a lower die plate and an upper die plate, with lower and upper die plates being shiftable relative to one another between an open position and a closed position. The injection station additionally includes one or more lower mold halves rigidly secured to the lower die plate. The injection station additionally includes one or more upper mold halves floatingly secured to the upper die plate such that positions of the upper mold halves are configured to be adjusted with respect to the upper die plate. Each of the lower mold halves corresponds with an upper mold half to present one or more mold cavities when the lower and upper die plates are in the closed position.

Other embodiments of the invention disclose an injection station comprising a first die plate and a second die plate, with the first and second die plates being shiftable relative to one another between an open position and a closed position. The injection station additionally includes a first mold half rigidly secured to the first die plate. The injection station additionally includes a second mold half floatingly secured to the second die plate such that a position of the second mold half is configured to be adjusted with respect to the second die plate. The first mold half corresponds with the second mold half to present one or more mold cavities when the first and second die plates are in the closed position.

Some embodiments of the invention disclose a method of operating an injection station of an injection blow molding machine. The method includes the initial step of providing a first mold half rigidly secured to a first die plate and a second mold half floatingly secured to a second die plate. The first and second mold halves are configured to be shifted with respect to each other between an open position and a closed position, whereby in the closed position the first and second mold halves present a parison-forming cavity. The method includes the additional step of actuating the second die plate towards the first die plate so as to cause the first and second mold halves to shift from the open position to the closed position. During the actuating step, a position of the second mold half is adjusted with respect to the second die plate so as to align the second mold half with the first mold half.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE FIGURES

Embodiments of the present invention are described in detail below with reference to the attached drawing figures, wherein.

Figure 1:
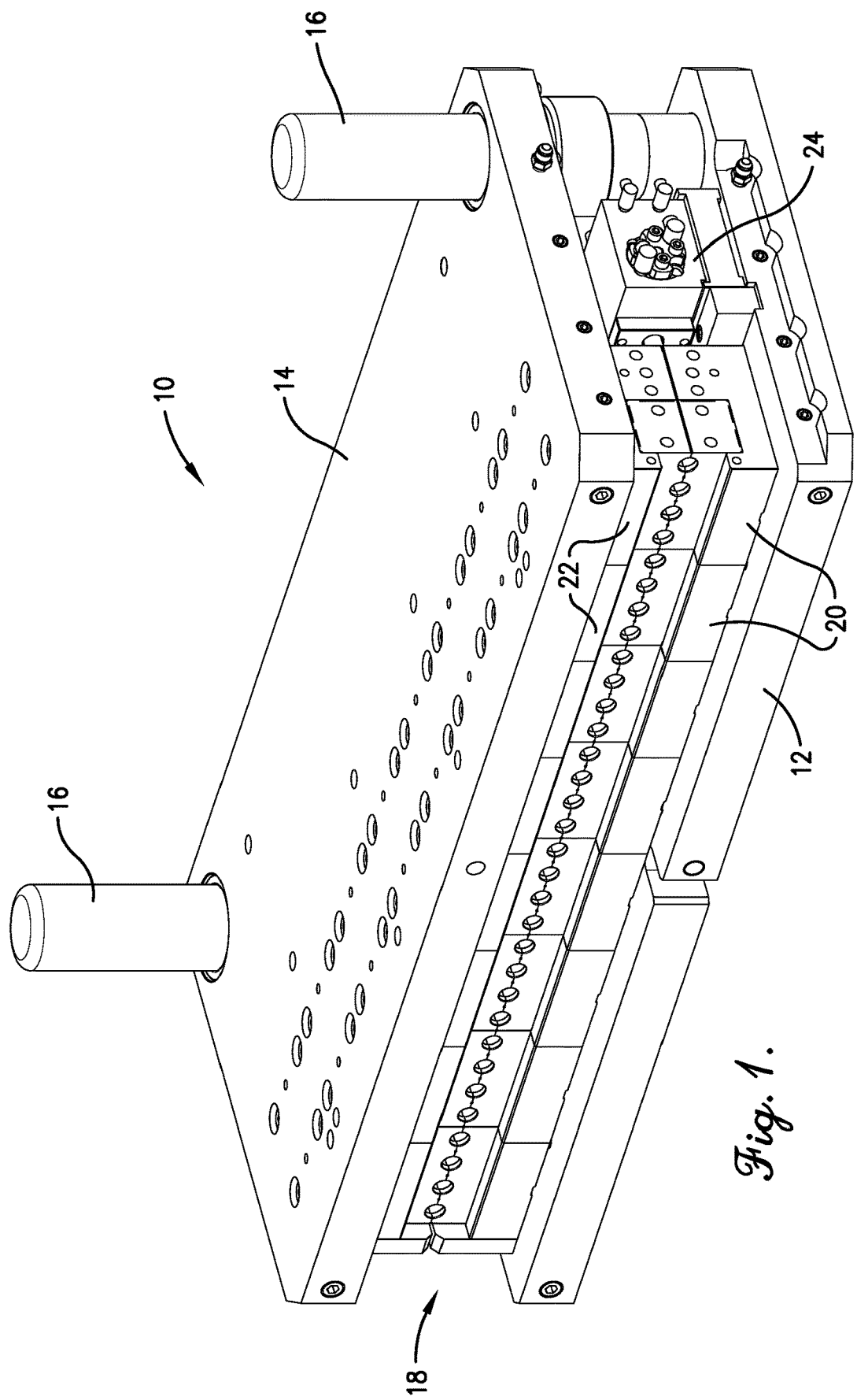
FIG. 1 is a perspective view of an injection station in a closed position, with the injection station including a lower die plate with a plurality of lower mold halves secured thereto, and an upper die plate with a plurality of upper mold halves secured thereto.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 2:
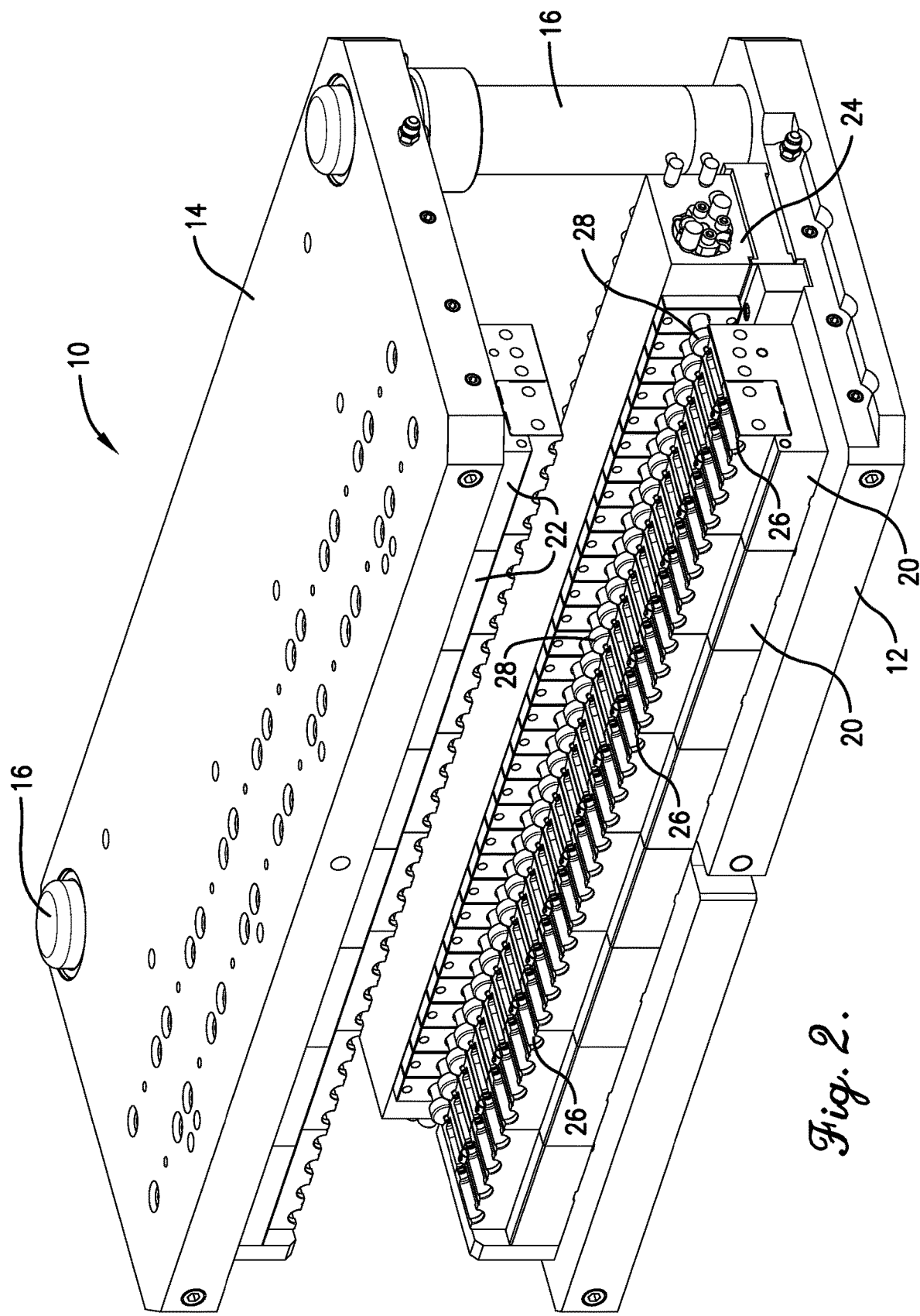
FIG. 2 is a perspective view of the injection station of FIG. 1 in an open position.

Embodiments of the present invention are broadly directed to an injection station 10, as illustrated in FIGS. 1-2, which is configured to be used in an injection blow molding machine (not shown in its entirety) for injection molding a hot-melt resin to form one or more parisons. Upon injection molding the resin to form parisons, the resulting parisons may be blow molded, via a separate blowing station (not shown) of the injection blow molding machine, so as to form molded articles from the parisons.

As illustrated in FIGS. 1-2, the injection station 10 may include a lower die plate 12 that is configured to be generally remain stationary. The injection station 10 may further include an upper die plate 14 positioned above the lower die plate 12, with the upper die plate 14 being shiftable (by means not illustrated) vertically toward and away from the lower die plate 12 on upright guides 16. The injection station 10 may further include a split parison mold assembly 18 comprising a plurality of lower mold halves 20 secured to the lower die plate 12 and a complementary plurality of upper mold halves 22 secured to the upper die plate 14. The injection station 10 may further include a resin injection manifold 24 positioned between the lower and upper die plates 12, 14 generally rearward of the split parison mold assembly 18. With the lower and upper die plates 12, 14 in a closed position (e.g., FIG. 1), the split parison mold assembly 18 is closed, such that the lower and upper mold halves 20, 22 are engaged to cooperatively form one more parison cavities 26 (See FIG. 2) within which resin may be injected to form parisons. The resin may be injected into the parison cavities 26 via a plurality of injection nozzles 28 extending forward from the injection manifold 24 into engagement with the lower mold halves 20.

As used herein, the terms "forward" or "front" refers to a direction away from the upright guides 16 of the injection station 10, while the terms "rearward" or "back" refers to a direction towards the upright guides 16. The relative terms "left" and "right" refer to lateral directions with respect to the injection station 10, such as the lateral direction extending between the upright guides 16. With reference to the injection station 10 illustrated in FIGS. 1-2, a right side of the injection station 10 is illustrated on the left side of the figure, while a left side of the injection station 10 is illustrated on the right side of the figure.

In some embodiments, each of the complementary lower and upper mold halves 20, 22 may present a plurality of cavities 26 (See FIG. 2) for forming a plurality of parisons. For example, the each of the lower and upper mold halves 20, 22 shown in the drawings may complementarily present four cavities 26 for forming four parisons during an injection molding cycle. However, in other embodiments, each complementary lower and upper mold half 20, 22 may be configured to only present a single cavity 26 for forming a single parison. In other embodiments, the split parison mold assembly 18 may comprise primarily monolithic components. For example, the lower and upper mold halves 20, 22 may each be formed as an integral, monolithic unit that, when closed, present one or more cavities 26. Nevertheless, as noted above, the lower and upper mold halves 20, 22 are generally configured to be shiftable toward and away from each other, by transitioning the injection station 10 between an open position and a closed position.

In some embodiments, each of the lower and upper mold halves 20, 22 may be formed as a unitary mold half, such as to individually present a lower or upper half of a parison cavity 26 for defining one half of the exterior shape of the body an injection-molded parison. Thus, when a complementary lower mold half 20 and an upper mold half 22 are closed together to form the parison cavity 26, the two mold halves 20, 22 can form the entire exterior shape of the body of an injection molded parison. In other embodiments, however, such as it shown in the figures, each of the lower and upper mold halves 20, 22 may respectively comprise an individual body mold portion and an individual neck mold portion (and/or interlock portions). In such embodiments, the body mold portions may be configured to define at least a portion of the exterior shape of the body of an injection-molded parison. The neck mold portions may be configured to define at least a portion of the exterior shape of the neck of an injection-molded parison. Such portions of the lower and upper mold halves 20, 22 may be formed by milling, molding, or otherwise machining various select materials, such as such as tool steel, stainless steel, Royalloy, H-13, or the like. Nevertheless, as noted above, certain embodiments provide for each of the lower and upper mold halves 20, 22 to be formed as an integral unit.

Remaining with FIGS. 1-2, each of the lower mold halves 20 may be associated with a corresponding one of the upper mold halves 22 with which it cooperates to define one or more parison cavities 26 when the upper mold halves 22 are lowered into engagement with the lower mold halves 20. To maintain proper alignment of the lower and upper mold halves 20, 22, thereby ensuring the parisons are manufactured according to required specifications, embodiments of the present invention provide for the lower and upper mold halves 20, 22 to be uniquely configured with an alignment system, as discussed in more detail below. Broadly, certain embodiments provide for the lower mold halves 20 to be rigidly secured to the lower die plate 12, while the upper mold halves 22 may be floatingly secured to the upper die plate 14. As used herein, the term "rigidly secured" is used to mean that the two components that are secured together are restricted from changing positions with respect to each other. In contrast, the term "floatingly secured" is used to mean that the two components that are secured together may have their positions at least partially adjusted with respect to each other.

With the lower mold halves 20 rigidly secured to the lower die plate 12, the lower mold halves 20 will remain generally stationary (along with the lower die plate 12) during cycles of parison manufacturing. In contrast, with the upper mold halves 22 being floatingly secured to the upper die plate 14, the positions of the upper mold halves 22 may be at least partly adjustable as the upper mold halves 22 are raised and lowered (in connection with the raising/lowering of the upper die plate 14) into engagement with the lower mold halves 20. Although the following description is provided with respect to the upper mold halves 22 being floatingly secured to the upper die plate 14 and the lower mold halves 20 being rigidly secured to the lower die plate 20, it should be understood that other embodiments may provide for the lower mold halves 20 to be floatingly secured to the lower die plate 12 and the upper mold halves 22 to be rigidly secured to the upper die plate 14. In even further embodiments, each of the lower and upper mold halves 20, 22 may be floating secured to its respective die plate 12, 14.

Figure 3:
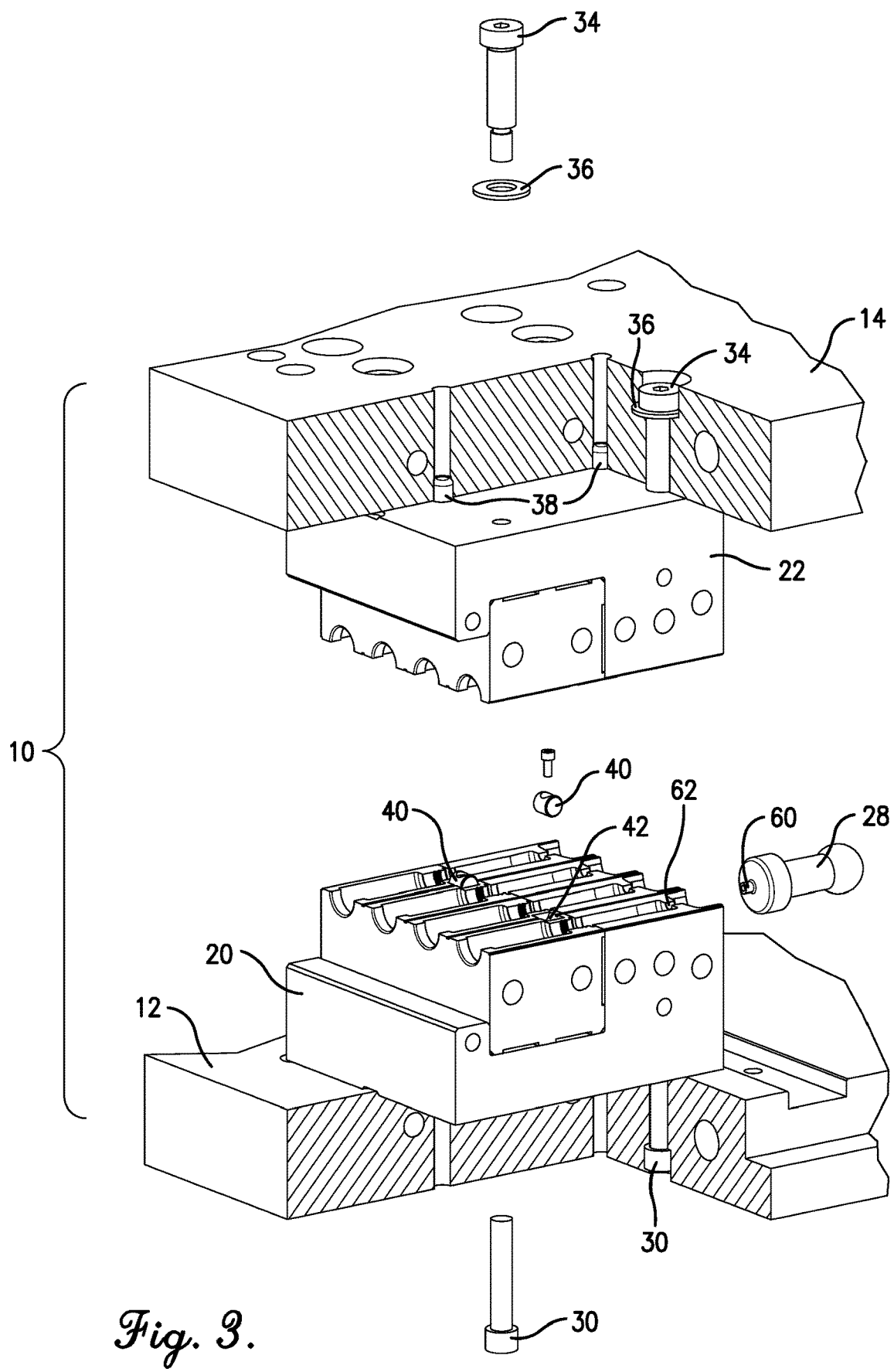
FIG. 3 is a exploded, partial downward-looking view of the injection station of FIGS. 1-2, particularly illustrating a lower mold half being secured to the lower die plate, and an upper mold half being secured to the upper die plate.
Figure 4:
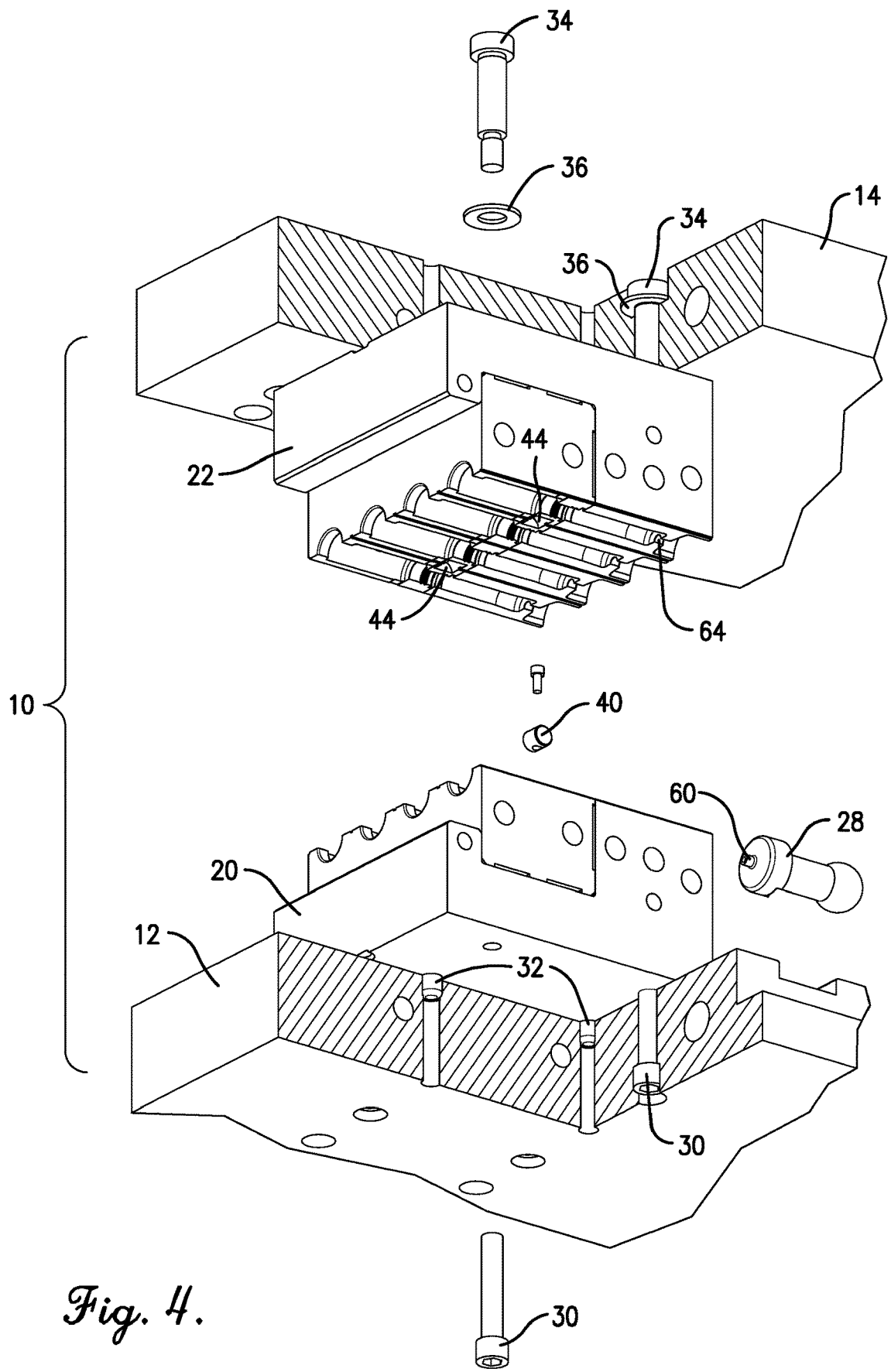
FIG. 4 is a exploded, partial upward-looking view of the injection station of FIG. 3.

In more detail, as illustrated in FIGS. 3 and 4, each of the lower mold halves 20 may be rigidly secured to the lower die plate 12 by one or more vertically-extending mounting fasteners 30. The mounting fasteners 30 may be configured as standard, threaded bolts that extend through openings or holes formed in the bottom die plate 12 and are threadedly engaged with threaded openings or holes formed in the bottoms of the lower mold halves 20. The mounting fasteners 30 may be tightly torqued so as to rigidly secure the lower mold halves 20 to the lower die plate 12 Furthermore, in some embodiments the proper alignment of each of the lower mold halves 20 within the lower die set 12 may be accomplished by dowel pins 32 (See FIG. 4), which extend from complementary dowel pin openings or holes formed in a top surface of the lower die set 12 and also in the bottoms of the lower mold halves 20.

To permit the upper mold halves 22 to be floatingly secured to the upper die set 14, the upper mold halves 22 may be secured to the upper die set 14 by one or more vertically-extending mounting fasteners 34 used in combination with spring washers 36. The mounting fasteners 34 may be configured as threaded shoulder bolts that extend through openings or holes formed in the upper die plate 14 and are threadedly engaged with threaded openings or holes formed in the top of the upper mold halves 22. The spring washers 36, also referred to as disc springs or Belleville springs, may be positioned on the mounting fasteners 34 between a head of the mounting fastener 34 and the upper die plate 14. The spring washers 36 may be conical or frusto-conical in shape and configured to provide a spring force (with a particular spring constant) along its axis. In some embodiments, multiple spring washers 36 may be used to modify the spring constant and/or amount of potential deflection of the spring washers 36. The mounting fasteners 34 may be torqued so as to secure the upper mold halves 22 to the upper die plate 14 but so as to provide a spacing between the heads of the mounting fasteners 34 and the upper die plate 14. Such a spacing is maintained by the spring washers 36, which function to maintain the mounting fasteners 34 in tension even with the heads of the mounting fasteners 34 being spaced from the upper die plate 14. However, given the spring characteristics of the spring washers 36, the mounting fasteners 34 are permitted to, at least nominally, have their positions shifted in a downward direction with respect to the upper die plate 14. Because the upper mold halves 22 are secured to the upper die plate 14 via the mounting fasters 34, the upper mold halves 22 are likewise configured to have their positions shifted in a downward direction with respect to the upper die plate 14.

Furthermore, in some embodiments, the openings or holes formed in the upper die plate 14 may have a diameter that is at least nominally larger than a diameter of the portion of the mounting fasteners 34 that extends through the openings or holes. As such, the mounting fasteners 34, and thus the upper mold halves 22 secured by the mounting fasteners, are configured to have their positions slightly adjustable in multiple additional directions (e.g., left, right, forward, backward). It is understood that these additional directions are generally orthogonal to the direction in which the upper mold halves 22 are shifted (i.e., upward/downward) as the upper mold halves 22 transition between open and closed positions. Nevertheless, the upward forces applied by the spring washers 36 permit the mounting fasteners 34 and the upper mold halves 22 to be securely held against the upper die plate 14. Thus, the incorporation of the spring washers 36 permit the upper mold halves 22 to be floatingly secured to the upper die set 14 so as to permit the position of the upper mold halves 22 to be at least partly adjustable with respect to the upper die plate 14 and the remaining components of the injection station 10.

Figure 5:
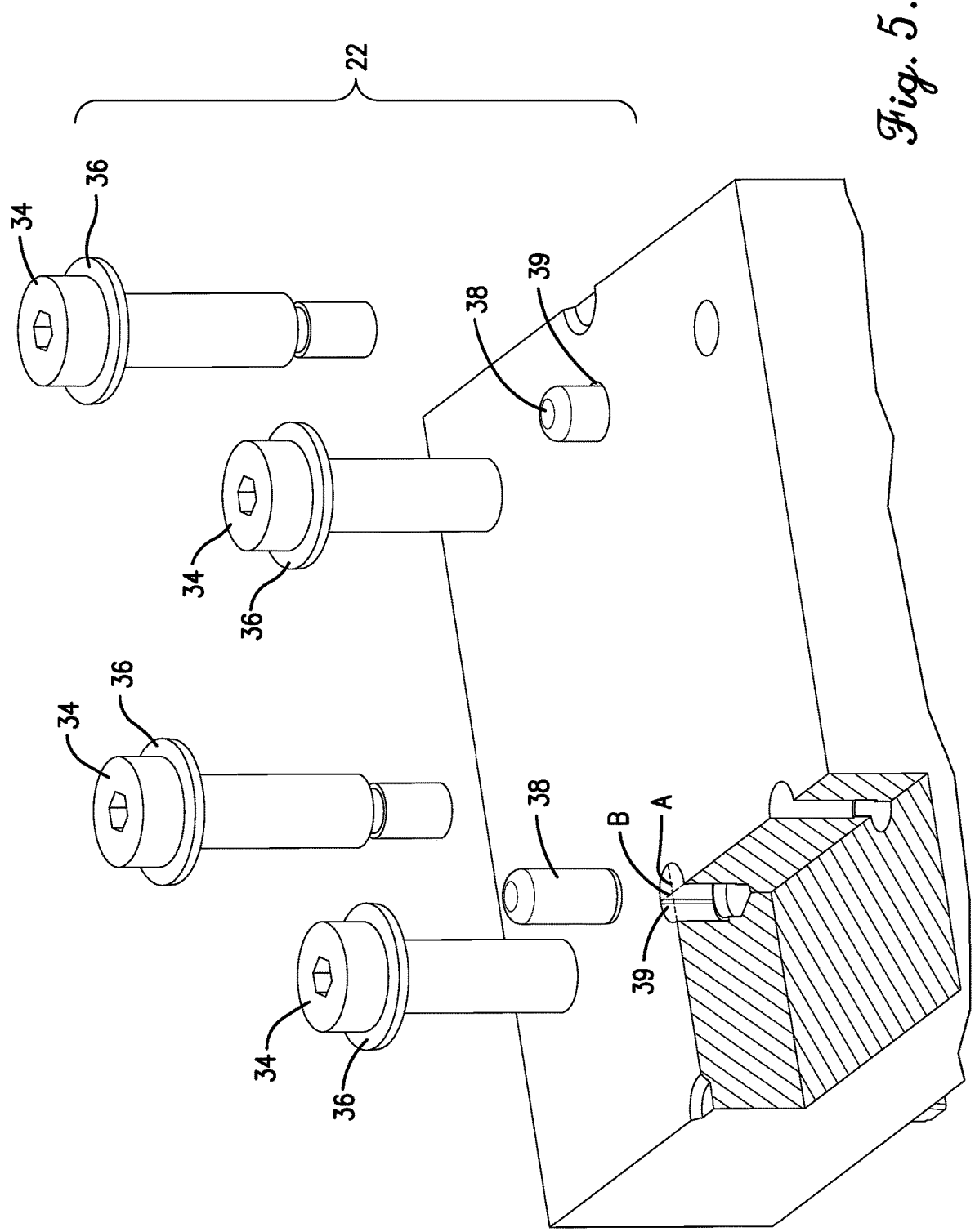
FIG. 5 is a top perspective, partial view of an upper mold half from FIGS. 1-4, particularly illustrating a dowel pin opening having a slotted shape.

As with the lower mold halves 20, in some embodiments the upper mold halves 20 will be at least partially maintained in proper position with respect to the upper die plate 14 via one or more dowel pins 38, which extend from complementary dowel pin openings or holes formed in a bottom surface of the upper die set 14 and in a top of the upper mold halves 22. However, as illustrated by FIG. 5, the dowel pin openings formed in the top of the upper mold halves 22 (labeled as dowel pin openings 39) may be slotted so as to form an oblong, ellipse, or oval-type shape. The slotted shape of the dowel pin openings 39 permit the positions of the upper mold halves 22 to be adjusted forward and rearward with respect to the dowel pins 38 and, thus, the upper die plate 14.

The magnitude of such adjustment may vary, depending on the slot size of the dowel pin openings 39. For example, in some embodiments, a major axis "A" of the dowel pin openings 39 may have a magnitude of between $^{10}/_{1000}$ and $^{50}/_{1000}$ of an inch, between $^{15}/_{1000}$ and $^{40}/_{1000}$ of an inch, or about $^{20}/_{1000}$ of an inch, or about $^{30}/_{1000}$ of an inch larger than the diameter of the dowel pins 38. As such, from a centered position with respect to the dowel pins 38, the positions of the upper mold halves 22 may be configured to be adjusted forward or rearward between $^{15}/_{1000}$ and $^{25}/_{1000}$ of an inch, between $^{7}/_{1000}$ and $^{20}/_{1000}$ of an inch, or about $^{10}/_{1000}$ of an inch, or about $^{15}/_{1000}$ of an inch.

Given the above, the mounting fasteners 34 and spring washers 36, in combination with the dowel pin openings 39, permit the upper mold halves 22 to be floatingly secured to the upper die set 14. As such, the positions the upper mold halves 22 may be securely held by the upper die plate 14 by may also be adjusted forward and rearward so as to be properly aligned with the lower mold halves 20. In addition to the forward and rearward adjustments, the mounting fasteners 34 and spring washers 36 may permit the upper mold halves 22 to be adjusted in a left or right direction, as will be described in more detail below.

To ensure alignment between the lower and upper mold halves 20, 22 when the injection station 10 is in the closed position, embodiments of the present invention provide for the lower mold halves 20 to include one or more projection elements that extend upward from an upper surface of the lower mold halves 20. For instance, as shown in FIGS. 3-4, the projection elements may comprise alignment dowels 40, which are removably secured to an upper surface of the lower mold halves 20. In various embodiments, each of the lower mold halves 20 may include various numbers of alignment dowels 40 depending on operational requirements. For example, each of the lower mold halves 20 illustrated in the present drawings include two alignment dowels 40. Nevertheless, embodiments may provide for each of the lower mold halves 20 to include more or less than two alignment dowels 40. In some embodiments, the alignment dowels 40 may be positioned adjacent to a center of the lower mold halves 20 relative to a front and back of the lower mold halves 20. For example, as illustrated in the drawings, the alignment dowels 40 may be positioned adjacent to a neck-forming portion of the lower mold halves 20. In some embodiments, the alignment dowels 40 may be positioned near the lateral sides of the lower mold halves 20. However, in other embodiments, the alignment dowels 40 may be positioned away from the lateral sides (e.g., towards a center) of the lower mold halves 20. In such embodiments, (i.e., with the alignment dowels 40 positioned away from the lateral sides of the lower mold halves 20), the alignment dowels 40 may be positioned between adjacent parison cavities 26.

In some embodiments, the alignment dowels 40 may have a generally cylindrical shape. The lower mold halves 20 may be formed with alignment dowel grooves 42 for receiving the alignment dowels 40. In embodiments in which the alignment dowels 40 are cylindrically shaped, the alignment dowel grooves 42 may be shaped as a half cylinder with a radius that corresponds with (i.e., generally equal to) a radius of the alignment dowels 40, and with a longitudinal length that corresponds with (i.e., generally equal to) a longitudinal length of the alignment dowels 40, such that alignment dowels 40 can fit precisely within the alignment grooves 42. Specifically, one-half (i.e., the lower half) of each alignment dowel 40 may be configured to fit down within a dowel groove 42 formed in lower mold half 20. The alignment dowels 40 may be held in place within the dowel grooves 42 of the lower mold halves 20 via threaded fasteners that extend through aligned radially-extending openings or holes formed in the alignment dowels 40 and threaded openings or holes formed into the upper surface of the lower mold halves 20. With the alignment dowels 40 secured within the dowel grooves 42 of the lower mold halves 20, the upper halves of the alignment dowels 40 extend upward from the lower mold halves 20 so as to present projection elements.

As with the lower mold halves 20, the upper mold halves 22 may be formed with alignment dowel grooves 44 (See FIG. 4) that correspond with each of the alignment dowel grooves 42 on the lower mold halves 20. Specifically, in some embodiments, when the alignment dowel grooves 44 of the upper mold halves 22 are aligned with the dowel grooves 42 of the lower mold halves 20, then the lower and upper mold halves 20, 22 are likewise aligned. The alignment grooves 44 may be configured for receiving the alignment dowels 40. In embodiments in which the alignment dowels 40 are cylindrically shaped, the alignment dowel grooves 44 may be shaped as a half cylinder with a radius that corresponds with (i.e., generally equal to) a radius of the alignment dowels 40, and with a longitudinal length that corresponds with (i.e., generally equal to) a longitudinal length of the alignment dowels, such that alignment dowels 40 can fit precisely within the alignment grooves 42. Specifically, one-half (i.e., the upper half or the projection) of each alignment dowel 40 may be configured to fit within a dowel groove 44 formed in an upper mold half 22, such that the alignment dowel 40 can be selectively received within the alignment dowel groove 44 formed in the upper mold half 22. Although the above description provides for the alignment dowels 40 to be secured to the lower mold halves 20 (i.e., within the dowel grooves 42) so as to present projection elements extending upward from the lower mold halves 20, other embodiments may provide for the alignment dowels 40 to be secured to the upper mold halves 22 (i.e., within the dowel grooves 44) so as to present projection elements extending downward from the upward mold halves 20.

Figure 6:
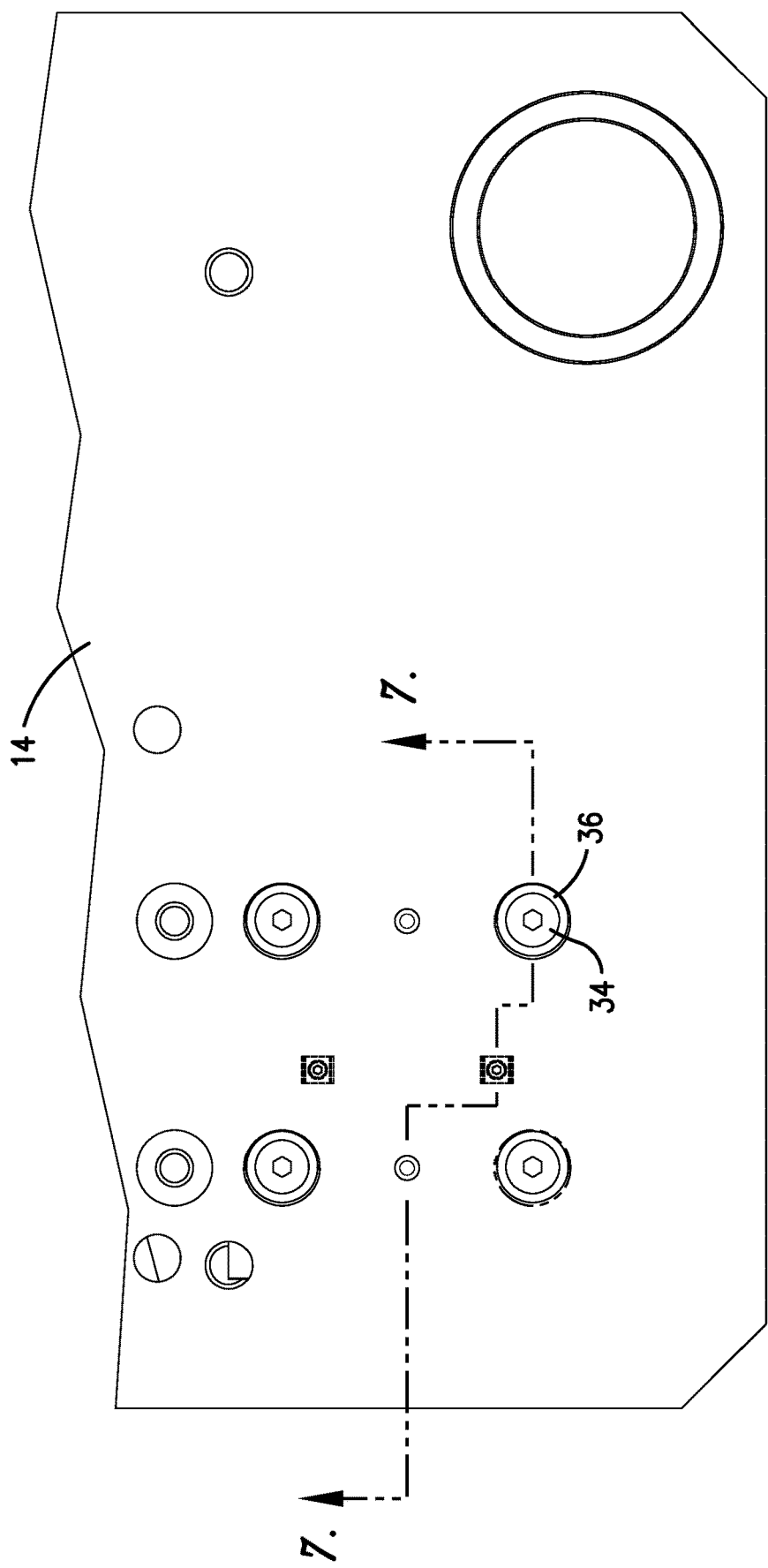
FIG. 6 is a partial top plan view of the injection station from FIGS. 1-2.
Figure 7:
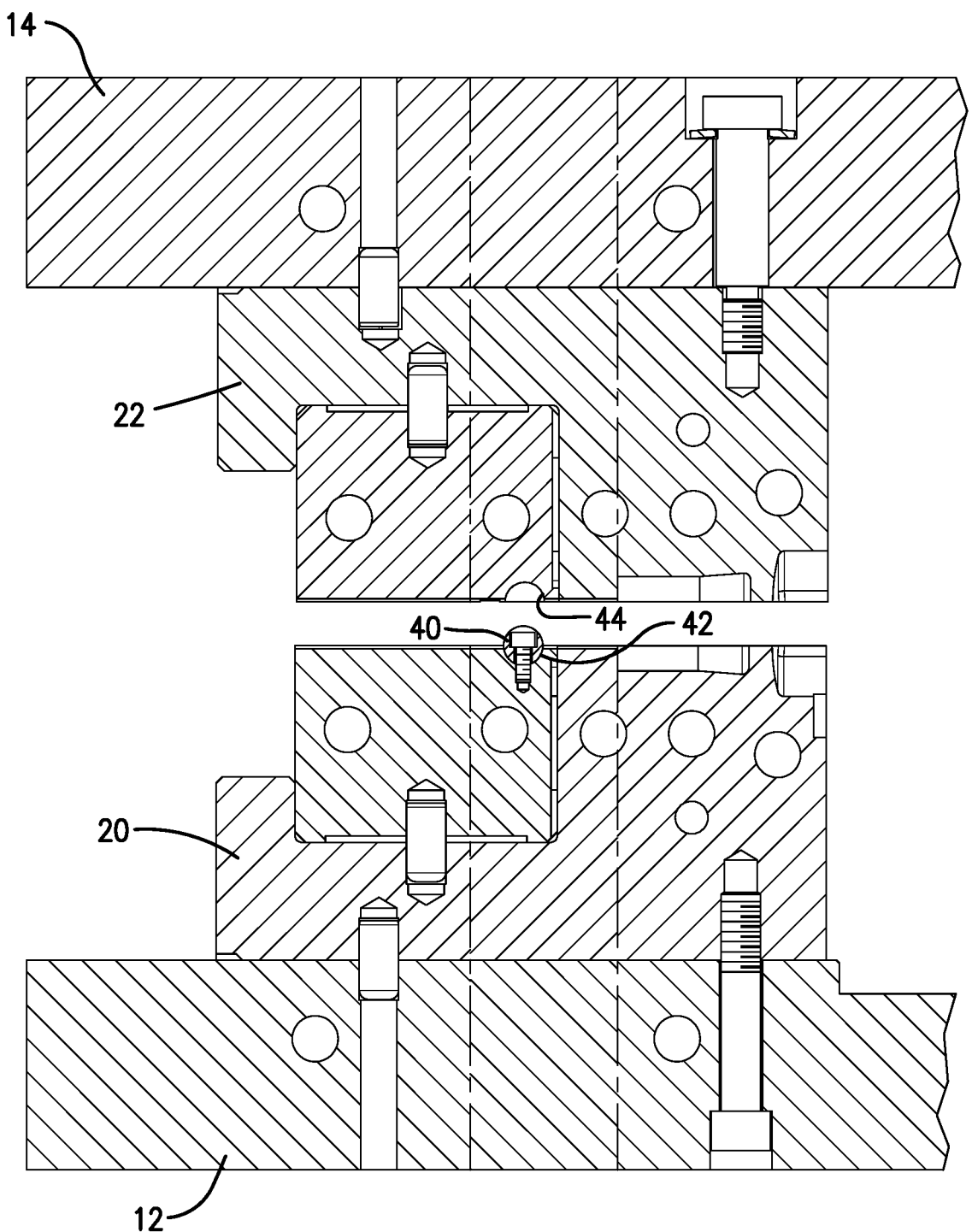
FIG. 7 is a cross-section of the injection station from FIG. 6 taken along the line 7-7, particularly illustrating the injection station being in a partially open position.
Figure 8:
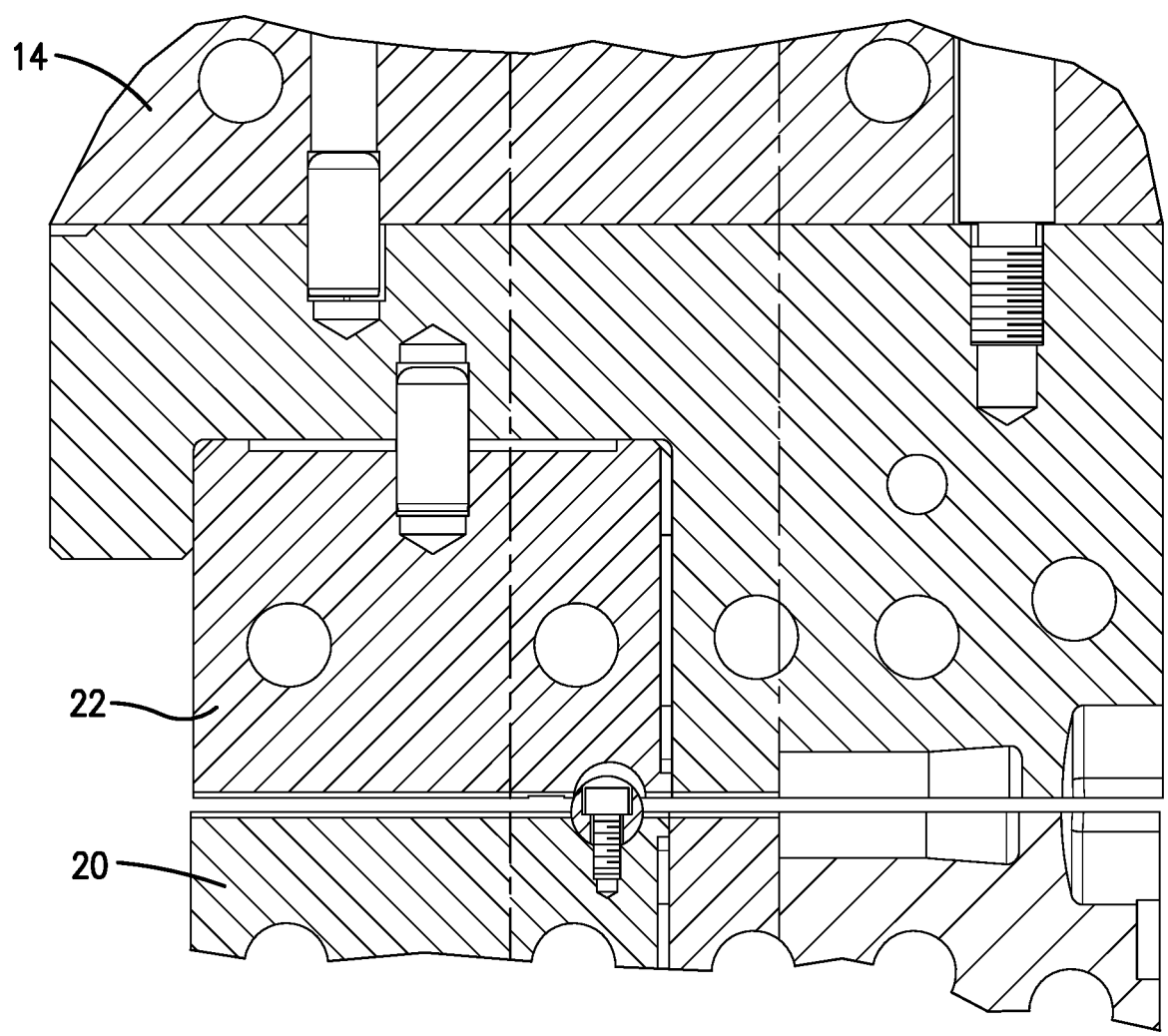
FIG. 8 is a partial view of the injection station from FIG. 7, particularly illustrating the injection station shifting to a closed position.

With the injection station 10 in an open position, the upper die plate 14, including each of the upper mold halves 22 floatingly secured thereto, may be spaced above the lower die plate 12, including each of the lower mold halve 20. FIG. 7 illustrates the injection station 10 (as taken from the cross-section line 7-7 of FIG. 6) in a partially-open position with an upper mold half 22 spaced above a lower mold half 20. As illustrated, the lower mold half 20 includes an alignment dowel 40 secured within the alignment groove 42 of the lower mold half 20 so as to present a projection element extending upward from the upper surface of the lower mold half 20. Furthermore, the upper mold half 22 is at least partially aligned with the lower mold half 20, with the alignment dowel groove 44 of the upper mold half 22 being generally aligned above the dowel groove 42 and the alignment dowel 40 of the lower mold half 20. From such an open position, the injection station 10 can begin (or continue) to actuate downward to a closed position. Specifically, the upper die plate 14, including the upper mold half 22 floatingly attached thereto, will be lowered towards the lower die plate 12 and the lower mold half 20 attached thereto. As illustrated in FIG. 8, however, the upper mold half 22 may not be in precise alignment with the lower mold half 20. Regardless, the projection element in the form of alignment dowel 40 functions, in combination with the alignment dowel groove 44 of the upper mold half 22, to force the upper mold halve 22 into precise alignment with the lower mold half 20 as the upper mold half 22 is lowered into engagement with the lower mold half 20.

Figure 9:
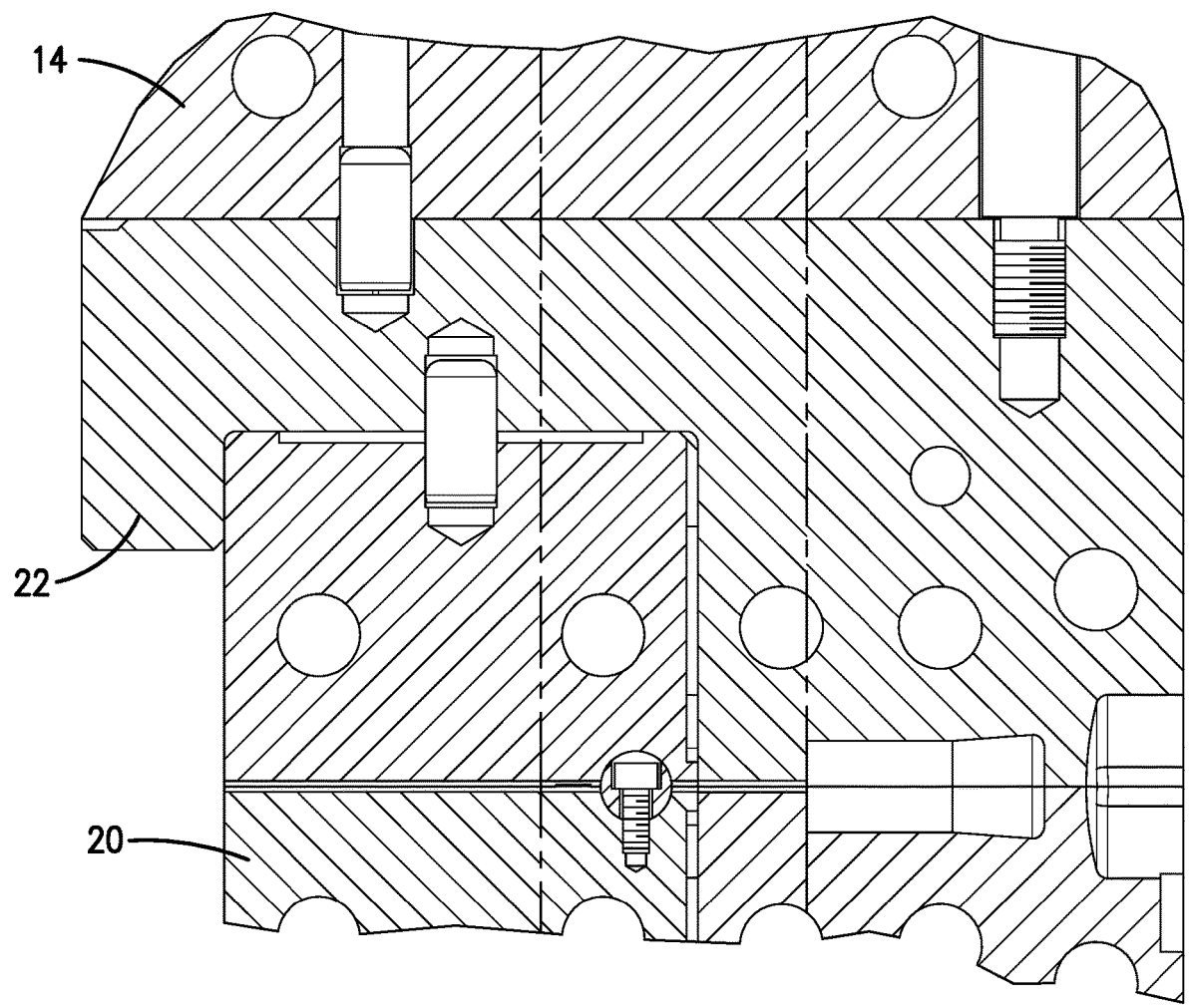
FIG. 9 is a partial view of the injection station from FIG. 7, particularly illustrating the injection station in a closed position.

For example, as illustrated in FIG. 8, the upper mold half 22 may be at least partially out of alignment in a rearward direction with respect to the lower mold half 20. However, as the upper mold half 22 is lowered into engagement with the lower mold half 20, an upper surface of the alignment dowel 40 will come into contact with a portion of the lower surface of the alignment dowel groove 44 of the upper mold half 22. As the upper mold half 22 completes its lowering into engagement with the lower mold half 20, the alignment dowel 40 will force the upper mold half 22 forward (via a force applied by the upper surface of the alignment dowel 40 against the alignment dowel groove 44) until the upper half of the alignment dowel 40 (i.e., the projection) can be aligned with and completely received within the alignment dowel groove 44, as is illustrated in FIG. 9. In such a position (i.e., with the upper half of the alignment dowel 40 aligned with and completely received within the alignment dowel groove 44), the upper mold half 22 will be positioned in precise front-to-back alignment with the lower mold half 20, such that a parison can be accurately formed within the parison cavity 26 presented by the adjacent upper mold half 22 and lower mold half 20. It should be understood that although the alignment dowels 40 functions to force the upper mold halves 22 forward or rearward, embodiments provide for the position of the upper mold halves 22 to be adjusted in such a forward or rearward direction because the upper mold halves 22 are floatingly secured with the upper die plate 14, as was previously described.

Figure 10:
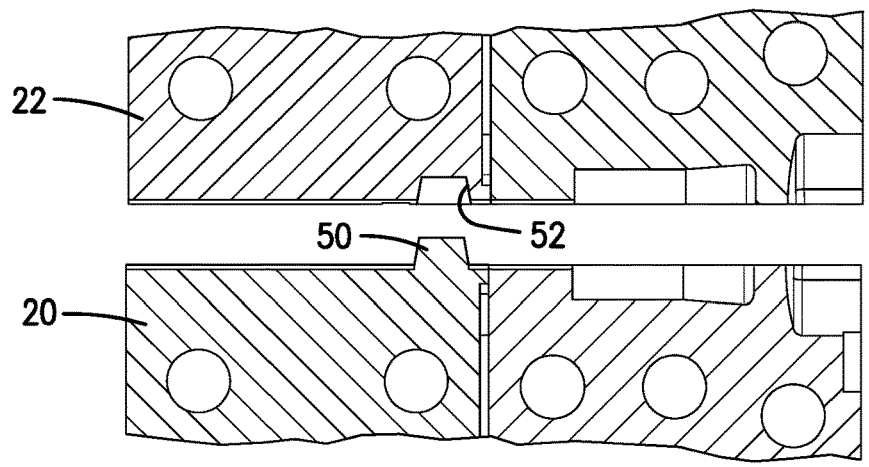
FIG. 10 is a cross-section of an additional embodiment of an upper mold half and a lower mold half according to embodiments of the present invention, with the upper mold half and the lower mold half being in a partially open position.
Figure 11:
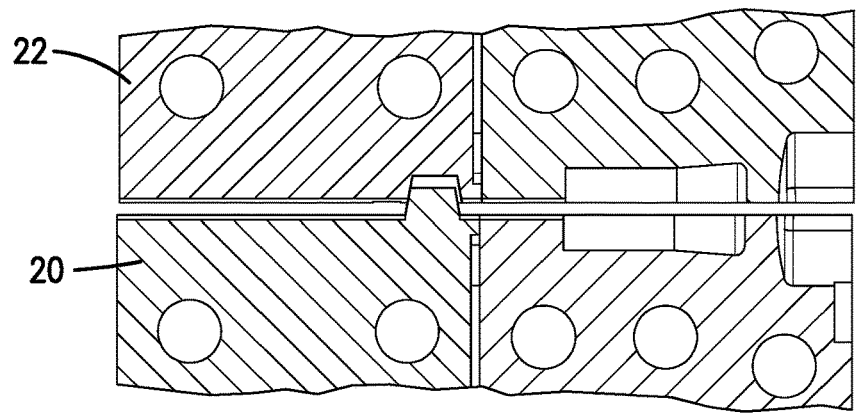
FIG. 11 is a cross-section of the upper mold half and the lower mold half from FIG. 10, particularly illustrating the upper mold half and the lower mold half shifting to a closed position.
Figure 12:
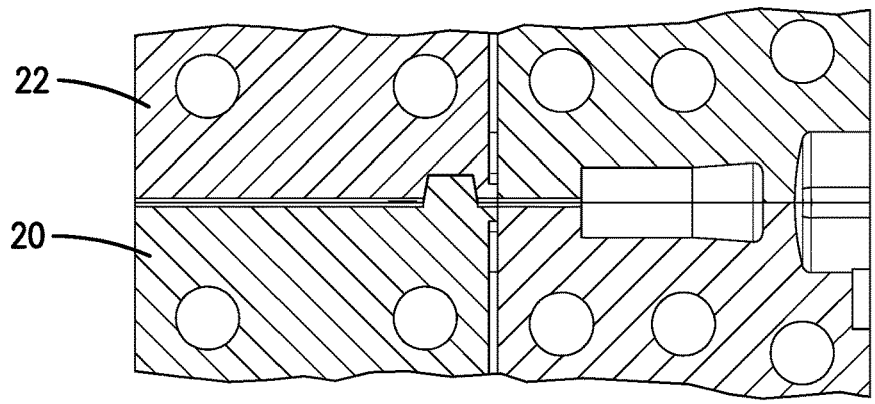
FIG. 12 is a cross-section of the upper mold half and the lower mold half from FIG. 10-11, particularly illustrating the upper mold half and the lower mold half in the closed position.

In addition to the cylindrically-shaped alignment dowels 40, certain embodiments of the present invention include other shaped projection elements for use in aligning the lower and upper mold halves 20, 22. For example, as illustrated in FIGS. 10-12, the lower mold halves 20 may include projection elements in the form of rectangular prisms 50 (e.g., rectangular blocks) that extend upward from the upper surface of the lower mold halves 20. In some embodiments, as shown in the drawings, the rectangular prisms 50 may be integrally formed with the lower mold halves 20. However, in other embodiments, the rectangular prisms 50 may be secured to the lower mold halves 20 via fasteners, such as with the alignment dowels 40. In addition to the rectangular prisms 50, embodiments may include projection elements having other shapes, such as conical, frustoconical, or the like. In some embodiments, each of the projection elements will formed such that a diameter of the projection (as measured across a horizontal cross-section) will increase in magnitude from an upper-most portion of the projection element to a portion of the projection element positioned adjacent to the upper surface of its respective lower mold half 20. Regardless of the particular shape of the projection elements, the upper mold halves 22 may be formed with alignment grooves, such as the rectangular alignment groove 52 of FIGS. 10-12, which are sized and shaped to correspond with the projection elements of the lower mold halves 20 so as to completely receive the projection elements when the upper mold halves 22 are engaged with the lower mold halves 20. Thus, if during the closing of the upper mold halves 22 into engagement with the lower mold halves 20, the upper mold halves 22 are out of alignment in a forward or rearward direction, the projections will cause the positions of the upper mold halves 22 to be shifted forward or rearward, as necessary, so as to properly align the upper mold haves 22 with the lower mold halves 20. Beneficially, embodiments of the projection elements in a rectangular prism, conical, or frustoconical-type shape may (in addition facilitating shifting the upper mold halves 22 forward and rearward) also provide for the positions of the upper mold halves 22 to be shifted left or right, as necessary, so as to properly align the upper mold halves 22 with the lower mold halves 20.

In addition to aligning the positions of the lower mold halves 20 and the upper mold halves 22 in forward and rearward directions, embodiments provide for aligning the positions in right and left directions. Specifically, for each of the parison cavities 26 presented by the engaged lower and upper mold halves 20, 22, an injection nozzle 28 will extend forward from the injection manifold 24 into the parison cavity 26 so as to be able to inject holt-melt resin therein to injection mold a parison. As illustrated in FIGS. 3-4, the lower mold halves 20, which are each rigidly secured to the stationary lower die plate 12, will be configured to support nozzle tips 60 of the injecting nozzles 28 via tip support sections 62 positioned near a rear of the lower mold halves 20. The upper mold halves 22 will include corresponding tip support sections 64 (See FIG. 4) positioned near a rear of the upper mold halves 22. Each of such tip support sections 62, 64 will have a generally half-circular shape so as to receive and/or support the circularly-shaped nozzle tips 60. As such, the tip support sections 62 of the lower mold halves 20 will generally support the bottom halves of the nozzle tips 60. When the upper mold halves 22 are lowered into engagement with the lower mold halves 20, the upper halves of the nozzle tips 60 will be received within the tip support sections 64 of the upper mold halves 22. If the upper mold halves 22 are partly misaligned (e.g., in a left or right direction), upper surfaces of the nozzle tips 60 will contact the lower surfaces of the tip support sections 64 of the upper mold halves 22 so as to force the upper mold halves 22 left or right, as necessary to be in proper alignment with the lower mold halves 20. Specifically, with the nozzle tips 60 properly aligned with the tip support sections 64 of the upper mold halves 22, such that the upper halves of the nozzle tips 60 can be completely received within the tip support sections 64, then the upper mold halves 22 will be in precise alignment (in a left and right direction) with the lower mold halves 20. The ability for the upper mold halves 22 to have their positions changed in the left and right directions not only provides for parisons to be formed according specifications (i.e., due to precise alignment with the lower mold halves 20), but also provides for reduced wear on the nozzle tips 60 and on the tip support sections 62, 64.

It should be understood that although the nozzle tips 60 function to force the upper mold halves 22 left or right, embodiments provide for the position of the upper mold halves 22 to be adjusted in such a left or right direction because the upper mold halves 22 are floatingly secured with the upper die plate 14, as was previously described. To facilitate the ability of the alignment of the upper mold halves 22 in the left and right directions, the dowel pin openings 39 formed in the top of the upper mold halves 22 may be at least partially slotted in the left and rights directions. Such a slotted shape of the dowel pin openings 39 permits the positions of the upper mold halves 22 to be adjusted leftward and rightward with respect to the dowel pins 38 and, thus, the upper die plate 14. The magnitude of such adjustment may vary, depending on the slot size of the dowel pin openings 39. For example, in some embodiments, a minor axis "B" of the dowel pin openings 39, as illustrated in FIG. 5, may have a magnitude of between $5/10000$ and $10/1000$ of an inch, between $1/1000$ and $5/1000$ of an inch, or about $4/1000$ of an inch larger than the diameter of the dowel pins 38. As such, from a centered position with respect to the dowel pins 38, the positions of the upper mold halves 22 may be configured to be adjusted left or right between 2.5/10000 and 5/1000 of an inch, between 5/10000 and 2.5/1000 of an inch, or about 2/1000 of an inch.

Figure 13:
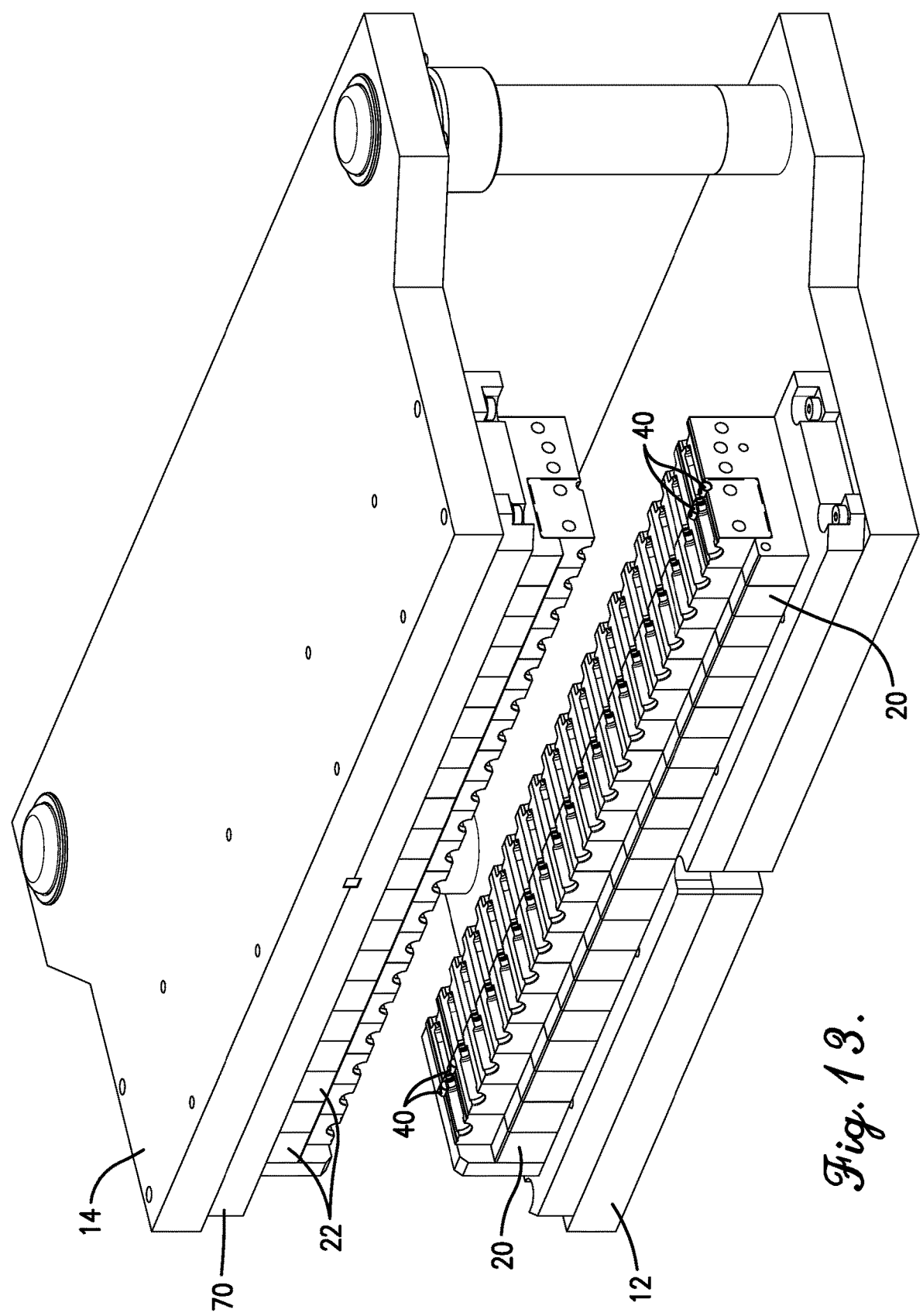
FIG. 13 is downward-looking perspective view of another injection station formed according embodiments of the present invention.
Figure 14:
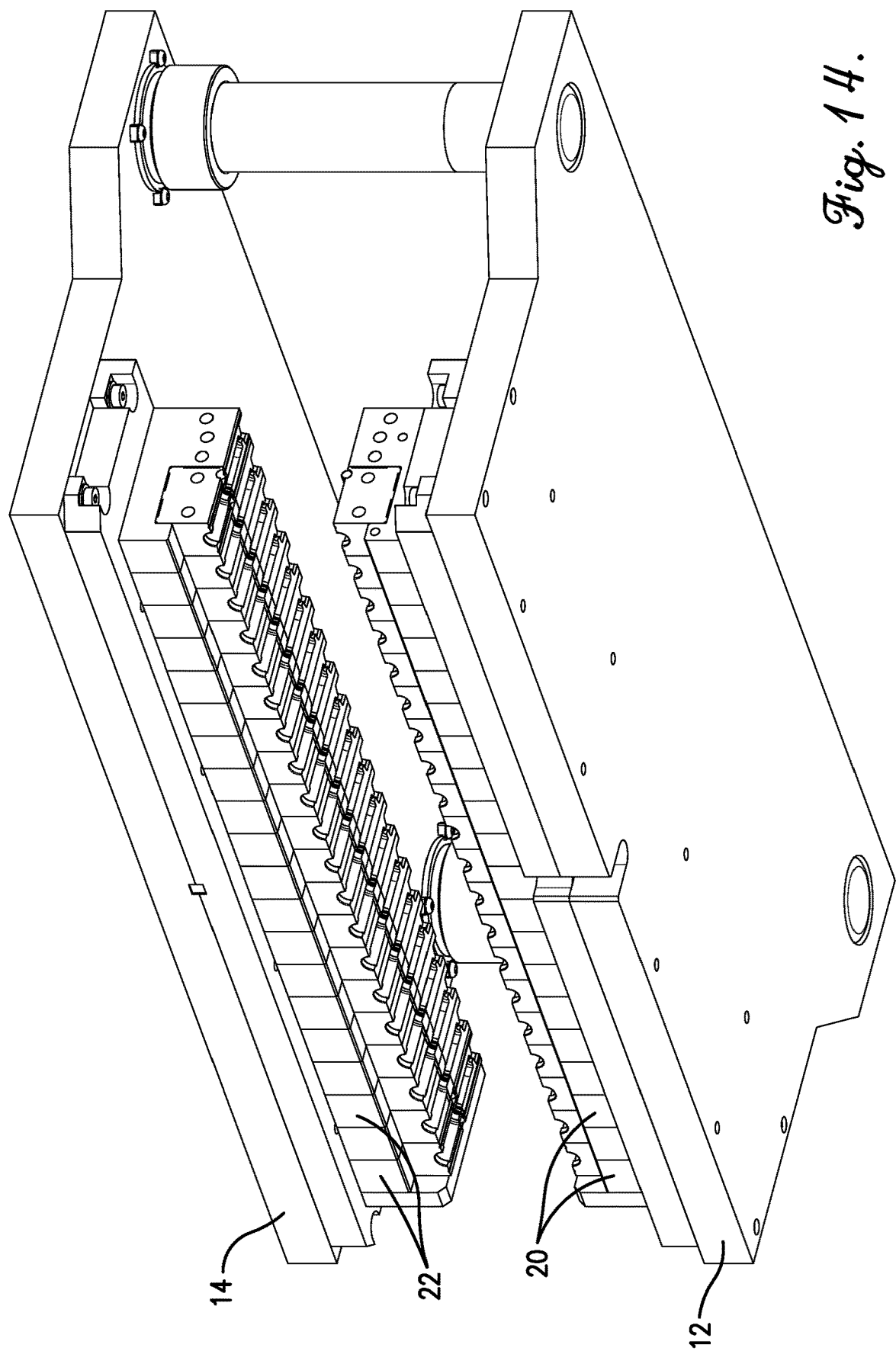
FIG. 14 is an upward-looking perspective view of the injection station from FIG. 13.
Figure 15:
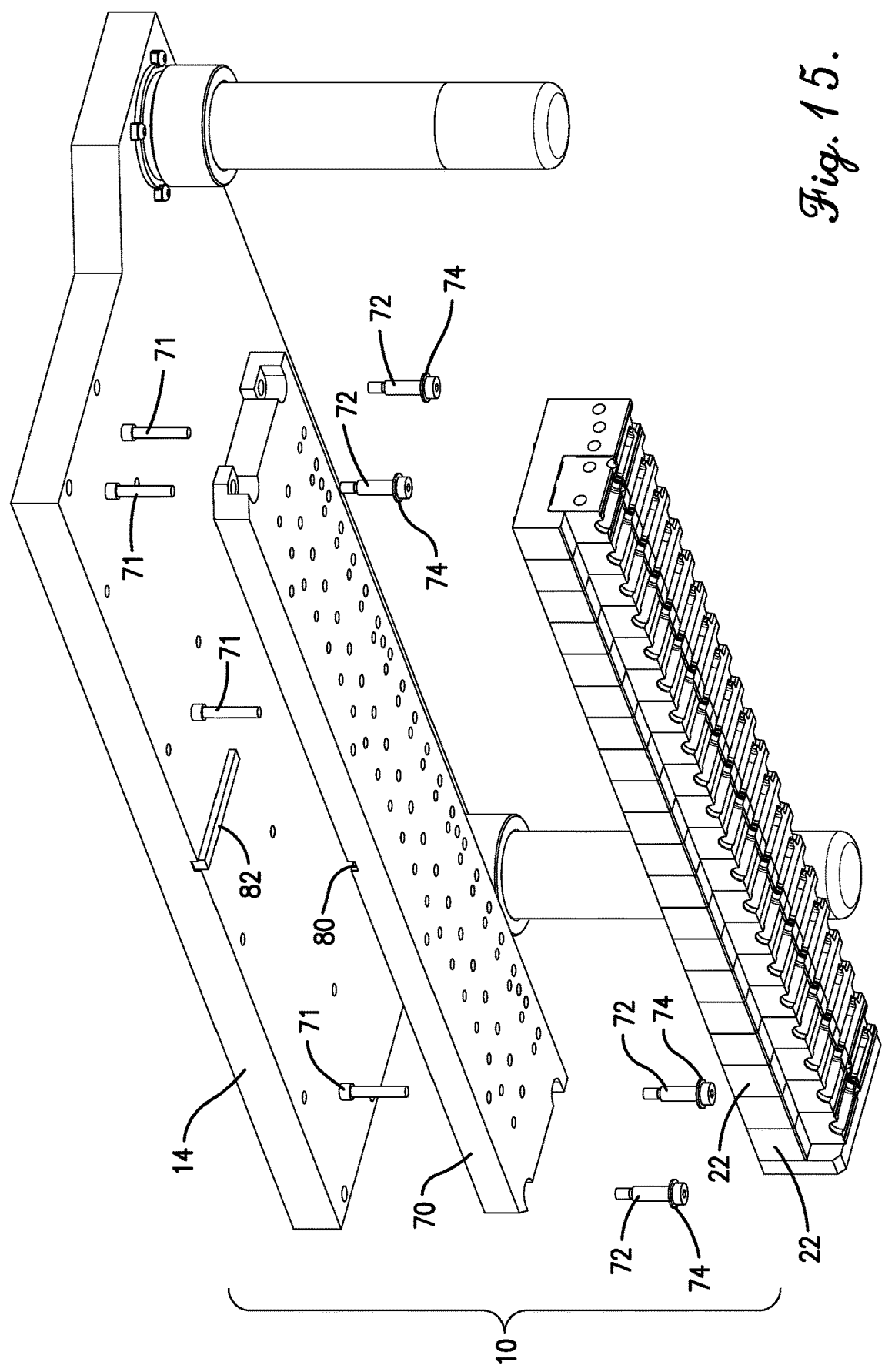
FIG. 15 is an exploded, partial view components of the injection station from FIGS. 14 and 15, partially illustrating an upper die plate, a floating plate, and upper mold halves.

As discussed above, ability of the upper mold halves 22 to be the floatingly secured to the upper die plate 14 provides for the positions of the upper mold halves 22 to be adjusted so as to be precisely aligned with the lower mold halves 20. Certain embodiments provide for the upper mold halves 22 to be floatingly secured to the upper die plate 14 even without the upper mold halves 22 being directly secured to the upper die plate 14. In more detail, as illustrated in FIGS. 13-15, some embodiments of the present invention permit for the upper mold halves 22 to be floatingly secured to the upper die plate 14 via an intermediate floating plate 70. As shown in FIG. 15, the upper mold halves 22 may each be rigidly secured to the floating plate 70 via one or more vertically-extending mounting fasteners 71. The intermediate floating plate 70 may itself be secured to the upper die plate 14 in a floating manner via one or more vertically-extending mounting fasteners 72 in combination with spring washers 74. In some embodiments, one or more of the mounting fasteners 72 may be configured as threaded shoulder bolts that extend through openings formed floating plate 70 and are threadedly engaged with threaded openings formed in the bottom of the upper die plate 14. The spring washers 74 may be positioned on the mounting fasteners 72 between a head of the mounting fastener 72 and the floating plate 70. In addition, some embodiments may provide for one or more of the mounting fasteners 72 to extend through openings formed in the upper die plate 14 and be threadedly engaged with threaded openings formed in the top of floating plate 70. The spring washers 74 may be positioned on the mounting fasteners 72 between a head of the mounting fastener 72 and the upper die plate 14.

The mounting fasteners 72 may be torqued so as to secure floating plate 70 to the upper die plate 14 but also to provide a spacing between the heads of the mounting fasteners 72 and the floating plate 70 and/or the upper die plate 14. Furthermore, in some embodiments, the openings formed in the floating plate 70 and/or the upper die plate 14 that receive the mounting fasteners 72 may have a diameter that is at least nominally larger than a diameter of the portion of the mounting fasteners 72 extending through the floating plate 70 and/or the upper die plate 14. As such, the mounting fasteners 72, the floating plate 70, and the upper mold halves 22 rigidly secured to the floating plate 70, are each configured to have their positions slightly adjusted in multiple positions (e.g., downward, left, right, forward, backward). However, the forces applied by the spring washers 74 permit the mounting fasteners 72 and the floating plate 70 (including the upper mold halves 22 secured thereto) to be securely held (in a floating fashion) against the upper die plate 14. Thus, the incorporation of the combination mounting fasteners 72 and spring washers 74 permit the upper mold halves 22 to be floatingly secured, via the mounting plate 70, to the upper die set 14 so as to permit the position of the upper mold halves 22 to be at least partly adjustable with respect to the upper die plate 14 and the remaining components of the injection station 10.

As indicated above, the use of the floating plate 70 to permit simultaneous, uniform adjustments of each of the upper mold halves 22 connected to the floating plate 70. Given that the upper mold halves 22 connected to the floating plate 70 are each adjusted in unison, embodiments may provide for the lower mold halves 20 to include fewer projection elements than as described with previous embodiments. For example, as illustrated in FIG. 13, the lower mold halves 22 may comprise projection elements, such as alignment dowels 40, only being associated with the two end lower mold halves 20 (i.e., the left-most lower mold half 20 and the right-most lower half 20). Nevertheless, because the positions of the upper mold halves 22 are configured to be adjusted in unison, the projection elements associated with the lower mold halves 20 are configured to align (in a forward and rearward direction) each of the upper mold halves 22 with the lower mold halves 20 when the upper mold halves 22 are lowered into engagement with the lower mold halves 20. In some embodiments, the positions of the upper mold halves 22 may also be adjusted in left and right directions via the nozzle tips 60 and the tip support sections 62, 64, as was previously described. However, in other embodiments, as shown in FIG. 15 the floating plate 70 and the upper mold halves 22 may be prevented from moving left and right (i.e., laterally) via a keyway 80 formed in a forward and rearward direction within a top surface of the floating plate 70 and a key 82 rigidly secured to the bottom of the upper die plate 14 and configured to be received within the keyway 80. With the key 82 within the keyway 80, the floating plate 70 and, thus, the upper mold halves 22 will be prevented from shifting left and right with respect to the upper die plate 14.

Although the invention has been described with reference to the preferred embodiment illustrated in the attached drawing figures, it is noted that equivalents may be employed and substitutions made herein without departing from the scope of the invention as recited in the claims.

What is claimed is:
1. An injection blow molding machine station comprising:
a lower die plate and an upper die plate, wherein said lower and upper die plates are shiftable relative to one another between an open position and a closed position;
a plurality of lower mold halves rigidly secured to said lower die plate; and
a plurality of upper mold halves floatingly secured to said upper die plate such that positions of said plurality of upper mold halves are configured to be adjusted with respect to said upper die plate,
wherein each lower mold half of said plurality of lower mold halves corresponds with one upper mold half of said plurality of upper mold halves to present one or more mold cavities when said lower and upper die plates are in the closed position, wherein each mold cavity includes a neck portion configured to receive a neck of a parison and a body portion configured to receive a body of a parison,
wherein each lower mold half of said plurality of lower mold halves includes at least one projection element extending upward from said lower mold half adjacent a neck portion of one of the mold cavities presented by said lower mold half, wherein each upper mold half of said plurality of upper mold halves includes at least one alignment groove, wherein said projection elements are configured to be received within said alignment grooves when said plurality of upper and lower mold halves are in proper alignment,
wherein the projection elements are cylindrically shaped, with each projection element including a longitudinal length, and wherein the longitudinal length of each projection element extends in a direction towards an adjacent neck portion of one of the mold cavities presented by said plurality of lower mold halves, wherein the projection elements are removably secured to said lower mold halves via fasteners that extend radially through the projection elements and into engagement with the lower mold halves.

2. The injection blow molding machine station of claim 1, wherein each lower mold half of said plurality of lower mold halves is rigidly secured to said lower die plate via one or more threaded fasteners and one or more dowel pins.

3. The injection blow molding machine station of claim 1, wherein each upper mold half of said plurality of upper mold halves is floatingly secured to said upper die plate via one or more threaded fasteners, one or more spring washers, and one or more dowel pins.

4. The injection blow molding machine station of claim 3, wherein for each upper mold half, said one or more dowel pins are configured to be inserted within openings formed in each upper mold half, wherein said openings are slotted.

5. The injection blow molding machine station of claim 1, wherein said upper die plate moves vertically on upright guides, wherein the positions of said plurality of upper mold halves are configured to be adjusted in a forward and rearward direction with respect to said upper die plate, wherein the forward direction is away from said upright guides and the rearward direction is towards said upright guides.

6. The injection blow molding machine station of claim 5, wherein said upright guides include a first upright guide positioned on a left side of said injection blow molding machine station and a second upright guide positioned on a right side of said injection blow molding machine station, wherein the positions of said plurality of upper mold halves are configured to be adjusted in a lateral direction with respect to said upper die plate, wherein the lateral direction extends between said first upright guide and said second upright guide.

7. The injection blow molding machine station of claim 1, wherein said projection elements comprise cylindrical dowels pins.

8. The injection blow molding machine station of claim 1, wherein said injection blow molding machine station is an injection station of an injection blow molding machine, and wherein said injection blow molding machine additionally includes a blowing station.

9. The injection blow molding machine station of claim 1, wherein said injection blow molding machine station is an injection station.

10. The injection blow molding machine station of claim 1, wherein each upper mold half of said plurality of upper mold halves is floatingly secured to said upper die plate via one or more shoulder bolts and one or more spring washers.

11. An injection blow molding machine station comprising:
a first die plate and a second die plate, wherein said first and second die plates are shiftable relative to one another between an open position and a closed position;
a first mold half rigidly secured to said first die plate; and
a second mold half floatingly secured to said second die plate such that a position of said second mold half is configured to be adjusted with respect to said second die plate,
wherein said first mold half corresponds with said second mold half to present a plurality of mold cavities when said first and second die plates are in the closed position, wherein each mold cavity includes a neck portion configured to receive a neck of a parison and a body portion configured to receive a body of a parison,
wherein said first mold half includes at least one projection element extending upward from said first mold half adjacent a neck portion of one of said mold cavities presented by said first mold half, wherein said second mold half includes at least one alignment groove, wherein said projection elements are configured to be received within said alignment grooves when said second mold half and said first mold half are in proper alignment,
wherein the projection element is cylindrically shaped, with the projection element including a longitudinal length, and wherein the longitudinal length of the projection element extends in a direction towards the neck portion of said one of the mold cavities presented by said first mold half,
wherein the projection element is removably secured to said first mold half via a fastener that extends radially through the projection element and into engagement with said first mold half.

12. The injection blow molding machine station of claim 11, wherein said second mold half is floatingly secured to said second die plate via one or more fasteners, one or more spring washers, and one or more dowel pins.

13. The injection blow molding machine station of claim 12, wherein for said second mold half, said one or more dowel pins are configured to be inserted within openings formed in said second mold half, wherein said openings are oval shaped.

14. The injection blow molding machine station of claim 11, wherein said upper die plate moves vertically on upright guides, wherein the position of said second mold half is configured to be adjusted in a forward and rearward direction with respect to said second die plate, wherein the forward direction is away from said upright guides and the rearward direction is towards said upright guides.

15. The injection blow molding machine station of claim 14, wherein said upright guides include a first upright guide positioned on a left side of said injection blow molding machine station and a second upright guide positioned on a right side of said injection blow molding machine station, wherein the position of said second mold half is configured to be adjusted in a lateral direction with respect to said upper die plate, wherein the lateral direction extends between said first upright guide and said second upright guide.

16. The injection blow molding machine station of claim 11, wherein said injection blow molding machine station is an injection station.

* * * * *